US012789194B2

(12) United States Patent
Wittwer et al.

(10) Patent No.: US 12,789,194 B2
(45) Date of Patent: Nov. 10, 2026

(54) FEED LEVEL CONTROL SYSTEM AND METHOD

(71) Applicant: Buhler AG, Uzwil (CH)

(72) Inventors: Simon Wittwer, Eschlikon (CH); Philipp Fritschi, Wuxi (CH); Xinhao Li, Wuxi (CH)

(73) Assignees: BÜHLER AG, Uzwil (CH); Xinhao Li, Wuxi (CN)

( * ) Notice: Subject to any disclaimer, the term of this patent is extended or adjusted under 35 U.S.C. 154(b) by 359 days.

(21) Appl. No.: 18/577,101

(22) PCT Filed: Jul. 12, 2021

(86) PCT No.: PCT/CN2021/105778
§ 371 (c)(1),
(2) Date: Jan. 5, 2024

(87) PCT Pub. No.: WO2023/283766
PCT Pub. Date: Jan. 19, 2023

(65) Prior Publication Data
US 2024/0307886 A1 Sep. 19, 2024

(51) Int. Cl.
*B02C 4/28* (2006.01)
*B02C 25/00* (2006.01)

(52) U.S. Cl.
CPC .............. *B02C 4/286* (2013.01); *B02C 25/00* (2013.01)

(58) Field of Classification Search
CPC ........... B02C 4/28; B02C 4/286; B02C 25/00; B02C 11/04
See application file for complete search history.

(56) References Cited

U.S. PATENT DOCUMENTS 4,572,441 A * 2/1986 Sangati .................... B02C 25/00 241/34
4,619,408 A * 10/1986 Sangati .................... B02C 4/286 241/37

FOREIGN PATENT DOCUMENTS

CN 200989806 Y * 12/2007
JP 2010058115 A * 3/2010
(Continued)

OTHER PUBLICATIONS

Translation of CN-200989806-Y.*
Translation of JP-2010058115-A.*
Translation of WO-2020025681-A1.*

*Primary Examiner* — Bobby Yeonjin Kim
(74) *Attorney, Agent, or Firm* — Colson Law Group, PLLC

(57) ABSTRACT

The present invention is related to an inlet arrangement for a grinding machine, preferably a roller mill, comprising a main sensor, preferably a force sensor, and an additional sensor, preferably a level sensor, that extends into the storage container to a level that corresponds to the level where the main sensor is provided, and a control unit which is configured to generate, from the values determined by the main sensor and the additional sensor and from a setpoint value, an output signal to control the flow of the milling material out of the storage container. The present invention is further more related to said control unit, a grinding machine, preferably a roller mill, comprising said inlet arrangement, and to a method for determining and controlling the level of milling material in a storage container for milling material of a grinding machine, preferably a roller mill, involving the above inlet arrangement.

7 Claims, 2 Drawing Sheets

(56) References Cited

FOREIGN PATENT DOCUMENTS

Figure 1:
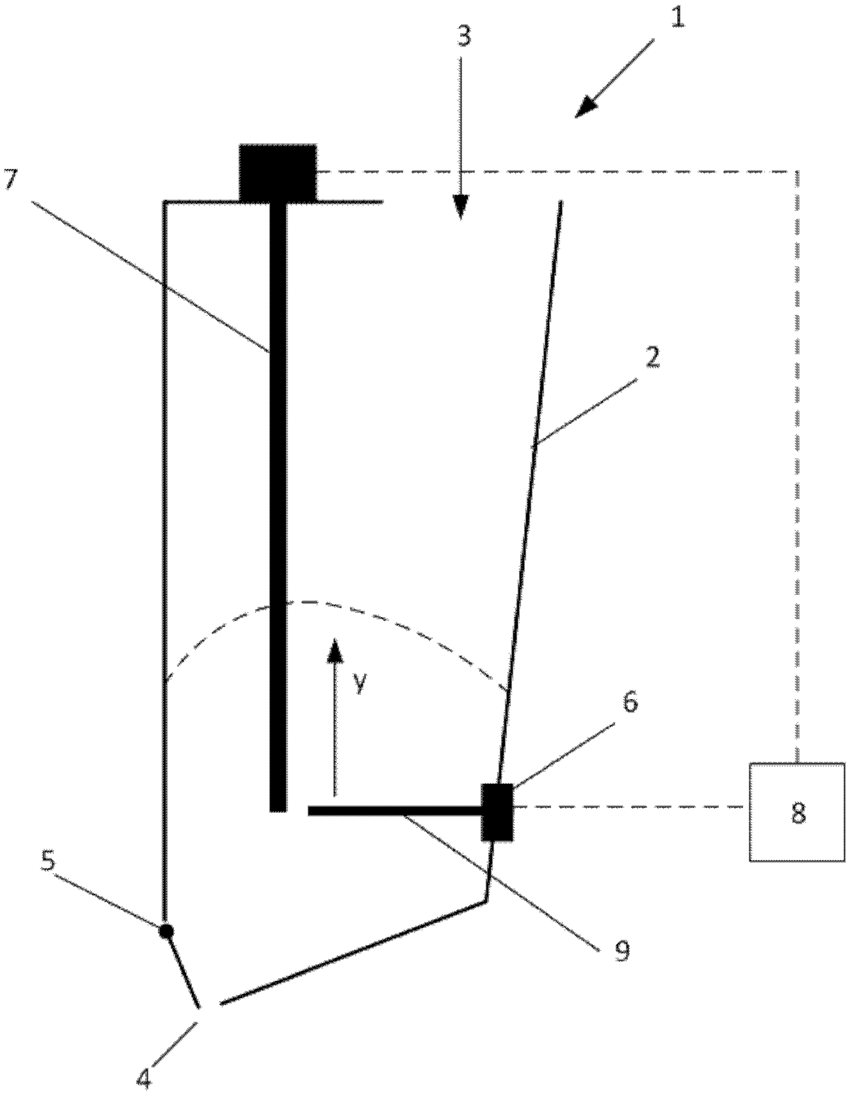

| | | | | | |
|---|---|---|---|---|---|
| WO | 2013/115747 | A1 | | 8/2013 | |
| WO | WO-2020025681 | A1 | * | 2/2020 | ............. G01F 22/00 |

* cited by examiner

FEED LEVEL CONTROL SYSTEM AND METHOD

The present invention relates to a feed level control system for a grinding machine, such as a roller mill, and a grinding machine, such as a roller mill with a feed level control system according to the present invention. The invention further relates to a method for determining the level of milling material and controlling the level of milling material of a storage container of a grinding machine, such as a roller mill.

In prior art grinding machines, e.g. roller mills or pellet mills, upstream the actual milling unit the milling material is fed to a storage container, e.g. by gravity, and collected therein. The milling material is then metered with the aid of a discharge device, e.g. a feed roller, and conveyed into a milling gap in the milling unit.

At the beginning of the milling process, the fill level of the storage container is first set manually, e.g. by an operator, as the target level. Said target level has to be set in such a manner that, on the one hand, sufficient free buffer volume is available in the storage container (which means the target level should be set as low as possible), but on the other hand, the milling material can be dosed over the entire length of the rollers (which means the target level should be set as high as possible in order to ensure that sufficient material is fed to the rollers).

A measuring device (e.g. force sensor or capacitive sensor) detects a deviation of the actual level from the target level during operation. A control device ensures that the discharge of material is adjusted so that the actual level corresponds as closely as possible to the target level.

If the density of the material to be detected changes or if its dispersion is poor, a sensor, such as a force sensor, will not be able to detect the fill level precisely enough. Also, when such an amount of material is in the storage container that it forms a cone with an arch-like surface shape, a sensor will measure a fill level that is inconsistent with the actual fill level.

It is therefore necessary that a calibration of the sensor, such as a force sensor, must be carried out, which is highly dependent on the properties of the material to be processed, in particular the moisture, density and granulation distribution of the material to be processed.

The disadvantage of such measuring arrangements with a single sensor (single dimension of measurement) is that the actual level measured by the measuring device may not correspond to the actual fill level of the storage container. The operator must therefore check manually the actual fill level and make a correction to the actual level determined.

In WO 2020/025681, an automatic determination of the fill level of the storage container has been described. Said automatic determination is based on a force sensor in combination with a level sensor that is provided in an upper section of the storage container, preferably at a vertical distance from 20 to 60 cm from the force sensor. The system of WO 2020/025681 comprises a control unit that is designed to determine a first fill level of the storage container from the weight force determined by the force sensor. The control unit is further designed to determine a characteristic fill level curve based on the determined first fill level and a milling material level determined by the level sensor. Said determination is made when the milling material level has reached the position of the level sensor in the storage container.

In the method of WO 2020/025681, the level sensor only carries out a measurement when the milling material level has reached the level sensor. In order to verify that the force sensor and the level sensor are synchronized, it is necessary to regularly exceed and undershoot the milling material level at the level sensor so as to cause a measurement by the level sensor.

It was the problem of the present invention to overcome the problems of the prior art and in particular to provide a feed level control system that provides for an increased stabilization of the material flow and allows more flexibility to the operator.

The above problem has been solved by the subject-matter as defined in the claims.

In detail, the present invention is related to an inlet arrangement for a grinding machine such as a roller mill comprising:

- a storage container with at least one milling material inlet and at least one milling material outlet,
- at least one metering device arranged in the storage container for metering milling material into a milling gap of the grinding machine, preferably roller mill, through the milling material outlet,
- a main sensor, preferably a force sensor, provided at the storage container at a level for determining a weight force (FG) exerted by the milling material,
- an additional sensor, preferably a level sensor, provided at the storage container for determining a milling material level in the storage container,
- a control unit which is connected or connectable to the main sensor and the additional sensor, characterized in that
- the additional sensor extends into the storage container to a level that corresponds to the level where the main sensor is provided, and
- the control unit is configured to generate, from the values determined by the main sensor and the additional sensor and from a setpoint value S, an output signal to control the flow of the milling material out of the storage container.

The grinding machine, e.g. roller mill, of the present invention comprises a main processing zone for milling of milling material (e.g. at least two rollers defining a roller gap between them). The main processing zone (e.g. the roller gap) is supplied with milling material from the milling material outlet of the inlet arrangement. Such grinding machines, for example roller mills, are generally known and need not be described here in detail. The present invention can be applied on many different grinding machines, but mainly on roller mills.

The inlet arrangement of the present invention is characterized by an additional sensor, preferably a level sensor, that extends into the storage container of said inlet arrangement to a level that corresponds to the level where a main sensor, preferably a force sensor is provided. According to the present invention, the term "a level that corresponds to the level where a main sensor, preferably a force sensor is provided" means that the lower end of the additional sensor, preferably level sensor, arranged at the storage container is located at a level that is identical to the level where the main sensor, preferably force sensor is provided at the storage container, or deviates from the level where the main sensor, preferably force sensor is provided at the storage container by a small distance of 5 cm or less, preferably 2 cm or less, and most preferably 1 cm or less.

With said additional sensor, preferably level sensor that extends into the storage container of said inlet arrangement to a level that corresponds to the level where a main sensor, preferably force sensor is provided, it is possible to regularly and continuously calibrate the value determined by the main sensor, preferably force sensor. Since the additional sensor, preferably level sensor, is essentially always in contact with the milling material above the main sensor, preferably force sensor, it can continuously perform a level measurement. This is unlike the arrangement in WO 2020/025681, where the level sensor is arranged at a significant vertical distance from the force level sensor and thus unable to perform continuous measurements of the milling material level.

In the device described in WO 2020/025681, two things have to happen to exceed and undershoot the milling material level at the level sensor. First, the Milling material has to fluctuate naturally so much that the level sensor can be triggered. Secondly, the control unit has to regulate the level by its logic. These requirements are avoided by the present invention.

According to the present invention, a roller mill means a roller arrangement which can be used not only in the milling industry but also for other foodstuffs, powders, grains, intermediate food processing products and animal feed.

The inlet arrangement comprises a storage container with at least one milling material inlet and at least one milling material outlet.

The inlet arrangement further comprises at least one metering device arranged at the storage container for metering milling material into a milling gap of the grinding machine, preferably roller mill, through the milling material outlet. The metering device can simply be designed as a gap, wherein the discharge quantity can be adjusted, if necessary, by changing a gap width, e.g. with the aid of a throttle valve. The metering device may further comprise other elements which, for example, support the distribution of milling material in the storage container. These may comprise, for example, a conveying device such as a paddle or worm shaft. The metering device may also comprise a feed roller, which is designed to convey the milling material from the milling material outlet to the milling gap of the roller mill.

The metering device can be arranged downstream of the storage container, i.e. arranged between storage container and a milling gap of a roller mill. Alternatively or additionally, it can be provided that the metering device is connected upstream of the storage container so that the quantity of the milling material that is conveyed into the storage container can be dosed.

A main sensor, preferably force sensor, is arranged at the storage container to determine a weight force and/or similar physical parameter exerted by the material to be processed, i.e. the milling material. According to the present invention, said main sensor, preferably force sensor is designated as the main sensor, since it provides for the principal signal reflecting the amount of milling material in the storage container. Preferably, said main sensor, preferably force sensor may be a load cell or a piezoelectric sensor or a capacitive sensor. The full range of signals from this sensor are continuously or discontinuously detected and continuously or discontinuously forwarded to the control unit. Preferably, the sensor is touchable, so that it is possible to generate signals by human interaction. This is useful for checking the function of the force sensor and/or its interaction with the control unit described below.

Another sensor e.g. level is also provided at the storage container to determine a milling material level. According to the present invention, said sensor is also designated as additional sensor, since it provides for an additional signal that can be used for adjusting the signal from the main sensor, preferably the force sensor. Preferably, said additional sensor may be a level sensor, such as a capacitive rod sensor or a force sensor or a radio-frequency-sensor for detecting continuously the milling material level. The full range of signals from this sensor are continuously or discontinuously detected and continuously or discontinuously forwarded to the control unit.

The main sensor, preferably force sensor, can be arranged outside or inside the storage container. For example, the storage container can be connected to a force sensor, for example suspended from a force sensor or mounted on a force sensor. According to a preferred embodiment of the present invention, it is only necessary that a weight force exerted by the milling material in the storage container and the attainment of a milling material level can be determined by said force sensor.

Preferably, at least a part of the main sensor, preferably force sensor, is arranged in the storage container, especially preferably in a lower region of the storage container. In a preferred embodiment of the present invention, the main sensor is a force sensor which comprises an extension arm that protrudes into the storage container, preferably into a lower region of the storage container. More preferably, said lower region mentioned above is a lower third of the storage container. The lower the position of the force sensor in the storage container, the more milling material in the storage container will it be able to detect.

The additional sensor, preferably level sensor, is arranged in the storage container. Preferably, the additional sensor is a level sensor where one end of the level sensor is fixed at or on the top surface of the storage container, and the level sensor extends into the storage container. According to the present invention, the additional sensor, preferably level sensor, extends into the storage container to a level that corresponds to the level where the main sensor, preferably force sensor, is provided. In other words, a lower end of said additional sensor, preferably level sensor, is at the level of said main sensor, preferably force sensor, when said additional sensor, preferably level sensor, is provided at the storage container for operation. Alternatively, the position of the lower end of said additional sensor, preferably level sensor, when said additional sensor, preferably level sensor, is provided at the storage container for operation, may deviate from the level where the main sensor, preferably force sensor, is provided at the storage container by a small distance of 5 cm or less, preferably 2 cm or less, and most preferably 1 cm or less.

According to a preferred embodiment of the present invention, the main sensor is a force sensor which comprises an extension arm, preferably a rigid linear arm, which protrudes into the storage container, wherein said extension arm is provided at a level that corresponds to the level where on end of the additional sensor, preferably level sensor, in the storage container is located.

By this arrangement, it is essentially ensured that both or more sensors, e.g. the force sensor (main sensor) and the level sensor (additional sensor) may detect the milling material in the storage container once it has reached a level above the position of the main sensor, preferably force sensor.

According to a preferred embodiment of the present invention, it is also possible to provide more than one additional sensor (level sensor), preferably 1 to 6, more preferably 1 to 4 additional sensors. With such additional sensors, which may be preferably of the same kind as the level sensor described above, or alternatively sensors such as acoustic sensors, NIR sensors or X-Ray sensors, it may be possible to detect additional dimensions of the cone of milling material in the storage container, so as to further improve the measurement result.

The inlet arrangement further comprises a control unit which is connected or connectable to the force sensor and the level sensor. Said connections may be for example conventional electrical lines or a wireless or bluetooth connection.

The control unit can be a dedicated control unit of the inlet arrangement, which is connected to a higher-level control unit, for example of a roller mill. This is particularly advantageous if the inlet arrangement is intended for retro-fitting existing roller mills. Alternatively, the control unit can be implemented in a higher-level control unit, for example in the control unit of a roller mill or in a plant control system.

According to the present invention, the control unit is configured to generate, from the values determined by the main sensor, preferably force sensor (described above), and the additional sensor, preferably level sensor, and from a setpoint value S, an output signal to control the flow of the milling material out of the storage container.

The control unit may contain components for preprocessing the signals it obtains from the sensors, before the regulation process is carried out.

For example, the control unit may contain one or more A/D converters for converting analog signals from the sensors (for example physical indicator signals such as electric current, voltage, or frequency) into digital signals. Any commonly used A/D converter may be employed in the control unit of the present invention. According to the present invention, it is preferred that each of the sensors arranged in the inlet arrangement generates an analog signal, and that to each sensor there is attributed a respective A/D converter. In the preferred embodiment where one force sensor (main sensor) and one level sensor (additional sensor) is provided, two A/D converters are provided, one for the signal of the main sensor and one for the signal of the additional sensor.

Moreover, the control unit may contain one or more processing units for further processing digital signals derived either directly from the sensors or from the A/D converters. In the preferred embodiment where one force sensor (main sensor) and one level sensor (additional sensor) is provided, two processing units are provided, one for the signal of the main sensor and one for the signal of the additional sensor.

Said processing unit may preferably perform an operation selected from the group consisting of scaling, offset and filtering, and combinations thereof. Such processing units are known and may be for example conventional computers, workstations etc. equipped with the necessary software.

According to the present invention, an offset procedure may be carried out. An offset procedure involves the correction of the offset from the sensor signal, preferably by subtracting a constant value from the sensor signal. Offset procedures are known and used, for example, for converting negative values into positive values.

According to the present invention, a scaling procedure may be carried out. A scaling procedure involves a gain or attenuation of the sensor signals. For example, scaling may be performed by multiplying the sensor signal with a constant value. Scaling procedures are known and used, for example, for amplifying signals.

According to the present invention, a filtering procedure may be carried out. A filtering procedure may be performed, for example, to reduce the noise of the sensor signal. For example, a moving average filtering and/or an IIR-filter and/or a low pass-filter and/or a band pass-filter and/or a low pass-filter may be used in the control unit of the present invention.

According to a preferred embodiment of the present invention, one or more of the above processing operations may be carried out.

The signals, which have been preferably processed as described above, are transmitted to a calculation unit. Such calculation units are known and may be for example conventional computers, workstations etc. equipped with the necessary software.

In said calculation unit, a sensor value for the main sensor, preferably force sensor (i.e. the signal derived from the force signal which is the main sensor), is determined in dependence from the values detected by the one or more additional sensors, preferably level sensors. In the preferred embodiment where one force sensor (main sensor) and one level sensor (additional sensor) is provided, two preferably processed signals are provided to the calculation unit, one for the signal of the main sensor and one for the signal of the additional sensor.

Said calculation may involve a calibration of the signals provided by the main sensor, preferably force sensor, on the basis of the signals provided by the one or more additional sensors, preferably level sensors. In detail, said calculation may involve the calculation of calibration factors, level ranges, integrals, differential equations, or combinations thereof, for the main sensor, preferably force sensor, according to the signals derived from additional sensors, preferably level sensors In a preferred embodiment, said calculation procedure can be carried out using a timer, a trigger threshold, a difference between the signals derived from the main sensor, preferably force sensor, and the additional sensors, preferably level sensors, and combinations thereof.

The thus obtained signal value from the calculation unit is transmitted into a regulation unit, where the obtained signal value is compared with a setpoint level that may be provided by an operator, for example via an input signal or a computer interface. Such regulation units are known and may be for example conventional computers, workstations etc. equipped with the necessary software.

The setpoint level is defined as the level that should be reached by the milling material level measured by the sensors. It is a target level that can be determined automatically, or preferably is predetermined by an operator. The operator can for example provide a setpoint level by input of an analog signal, by input via a computer interface such as a keyboard or touchscreen, or by providing parameters necessary for determining the setpoint level, for example in a memory unit of the control unit.

If as a result of the comparison of the obtained signal value (i.e. the signal value derived from the sensors and obtained by preferably processing and subsequently calculation, as described above) with the setpoint level a deviation of the two values is identified, the obtained signal value is adjusted to the setpoint value.

This adjustment may be performed as a regulation procedure. According to a preferred embodiment of the present invention, the regulation procedure may be selected from the group consisting of PID-Regulation, Artificial-Intelligence (AI) regulation and linear or non-linear control system regulation.

In PID-Regulation, a controller integrated in a control loop acts on a controlled system in such a way that a variable to be controlled, i.e. the controlled variable, adjusts itself to the level of the selected reference variable (here the setpoint value) with the help of negative feedback, regardless of interference. PID-Regulation is well-known.

Artificial-Intelligence (AI) regulation is also known and involves the use of self-learning, machine learning algorithms. Artificial intelligence is a generic term for the “artificial” generation of knowledge from experience: An artificial system learns from examples and can generalize them after the learning phase has ended. For this purpose, algorithms in machine learning build a statistical model that is based on training data.

The regulation may also be a linear or non-linear control system regulation. In mathematics and science, a nonlinear system is a system in which a change of the output is not proportional to a change of the input. Nonlinear dynamical systems, describing changes in variables over time, may appear chaotic, unpredictable, or counterintuitive, contrasting with much simpler linear systems. Such systems are also well-known and may involve a decentralized system control with SISO (Single Input Single Output) and/or MIMO (Multiple Input and Multiple Output).

In the regulation procedure according to the present invention, the signal level (i.e. the signal value derived from the sensors and obtained by preferably processing and subsequently calculation, as described above) is compared with a defined setpoint level. Form this comparison, an output signal is identified or calculated.

According to a preferred embodiment of the present invention, also the levels of the main sensor, preferably force sensor, and the additional sensor (s), preferably level sensor (s), may be compared, and preferably the additional sensor, preferably a level sensor and more preferably a capacitive sensor, may be used to check if the level of said sensors is in an expected range.

In the regulation unit, an output signal is thus generated that is transmitted, preferably via a D/A converter, to a machine control element.

Any commonly used D/A converter may be employed in the control unit of the present invention. The D/A converter may be used to convert a digital value (here the output of the regulation procedure) into an analog (physical) signal (for example current, voltage, frequency), in order to operate an element of the inlet arrangement or the grinding machine, e.g. roller mill, for example an actuator.

According to the present invention, it is preferred that said machine control element influences the transport (flow) of milling material out of the storage container. For example, a motor with variable speed may be operated therewith in order to modify the speed of rotation of the rollers in a roller mill, therewith enhancing or decreasing the amount of milling material that is conveyed into the milling gap between the roller mills. Alternatively, an electromechanical or physical process may be initiated to turn or shift movable components of the inlet arrangement or a roller mill. For example, the machine control element may operate the metering device of the inlet arrangement, by swiveling a throttle valve of the metering device.

The control unit is connected or connectable to the machine control element. Said connections may be for example conventional electrical lines or a wireless or bluetooth connection.

The present invention also related to a method for determining and controlling the level of milling material in a storage container for milling material of a grinding machine such as a roller mill, the storage container comprising at least one milling material inlet, at least one milling material outlet and at least one metering device for metering milling material into a milling gap of the grinding machine through the milling material outlet, the method comprising the following steps:

determining a first parameter, preferably a weight force (FG), exerted by the milling material with a main sensor, preferably a force sensor, provided at the storage container at a level, determining a second parameter, preferably a milling material level, in the storage container with an additional sensor, preferably a level sensor, provided at the storage container such that the additional sensor, preferably level sensor, extends into the storage container to a level that corresponds to the level where the main sensor, preferably force, sensor is provided, optionally processing signals generated by the main sensor, preferably force sensor, and the additional sensor, preferably level sensor, providing a setpoint value (S), preferably by an operator, generating, from the values derived from the main sensor, preferably force sensor and the additional sensor, preferably level sensor, and from the setpoint value (S), an output signal to control the flow of the milling material out of the storage container.

The method can be performed as described above in detail with respect to the control element.

According to the present invention, the sensors continuously detect the milling material level in the storage container. This allows a continuous and precise regulation of the transport (flow) of the milling material out of the storage container, thus minimizing any fluctuation in the transport (flow) of the milling material by continuous operation of elements in the inlet arrangement and or the grinding machine, e.g. roller mill, that influence the transport (flow) of the milling material out of the storage container, for example a motor controlling the rotational speed of the roller mills or an actuator actuating a throttle valve in the metering device of the inlet arrangement.

According to a preferred embodiment of the present invention, with the above method it is achieved that at least 30% of milling material level deviation is in a range of ±2% around the mean value of the input signals from the sensors into the control unit, more preferably at least 60% of milling material level deviation is in a range of ±5% around the mean value of the input signals from the sensors into the control unit, and even more preferably at least 90% of milling material level deviation is in a range of ±10% around the mean value of the input signals from the sensors into the control unit.

According to a preferred embodiment of the present invention, with the above method it is achieved that at least 80% of any deviation of the output signal is in a range of ±2% around the mean value of the output signal from the control unit, more preferably at least 95% of any deviation of the output signal is in a range of ±5% around the mean value of the output signal from the control unit, and even more preferably at least 98% of any deviation of the output signal is in a range of +10% around the mean value of the output signal from the control unit.

These values can be reached during various stages of operation and with various raw materials, preferably over a longer period of time (>1-3 months) without any need for an operator to interfere in the process.

The present invention also relates to a grinding machine, preferably a roller mill, with an inlet arrangement according to the invention. All the advantages and further developments of the inlet arrangement described above are thus also applicable to a grinding machine, preferably a roller mill, according to the invention.

The roller mill comprises at least two rollers defining a roller gap between them for milling of milling material, the roller gap being supplied with milling material from the milling material outlet of the inlet arrangement. Such roller mills are generally known and need not be described here in detail.

Figure 2:
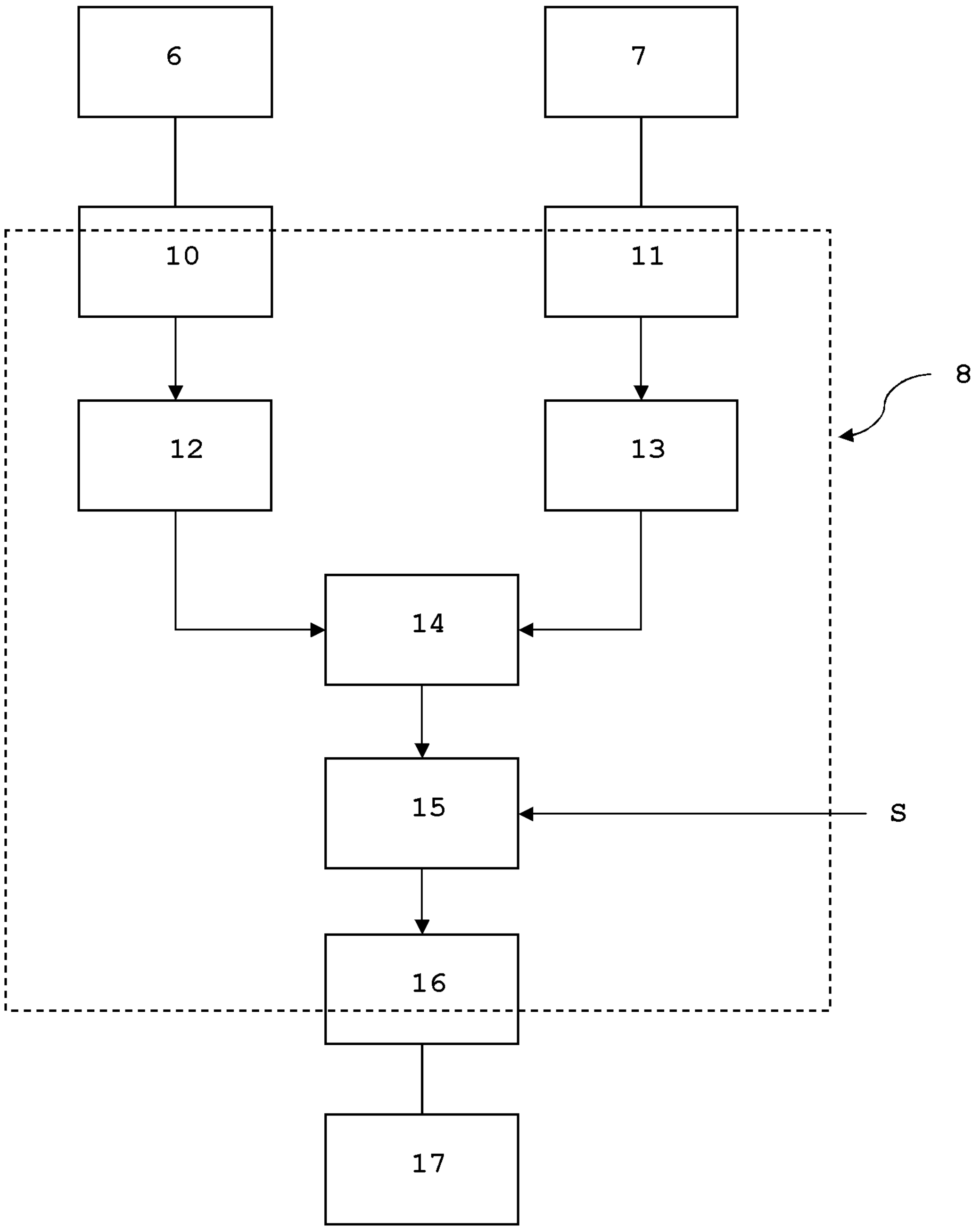

The present invention is described below in more detail with reference to a preferred embodiment in conjunction with the figures. It is shown:

FIG. 1 a schematic sectional view of an inlet arrangement according to the present invention; and FIG. 2 a schematic illustration of the components of a control unit and signal processing by said control unit according to the present invention.

FIG. 1 schematically shows an inlet arrangement 1 of a grinding machine, e.g. roller mill. The inlet arrangement 1 comprises a storage container 2 with a milling material inlet 3 and a milling material outlet 4. A metering device 5 is also arranged at the milling material outlet 4, which is designed as a throttle valve. A gap width of the milling material outlet 4 can be changed by swiveling the throttle valve.

A force sensor 6 is provided at the storage container 2, which comprises an extension arm 9 that projects into the storage container 2 and can be designed, for example, as a bending beam. When filling the storage container 2 with milling material, a cone of milling material is formed, which is shown schematically by the arched line in FIG. 1. As soon as the cone of milling material has reached the extension arm 9, the latter is loaded with a weight force FG. The control unit 8, which is connected to the force sensor 6 via a connection line (shown schematically by the dashed line), thus detects that a first fill level has been reached in the storage container 2.

When the storage container 2 is filled with further material, the cone of milling material and thus the fill level in the storage 2 container increases in the direction of the y arrow in FIG. 1. The increase in the fill level in the storage container 2 is detected by the control unit 8 by an increase in the weight force FG determined by the force sensor 6.

In addition, a level sensor 7 is provided that extends from the top of the storage container 2 to a level in the storage container 2 corresponding to the level of the extension arm 9 of the force sensor 6. Said level sensor 7 continuously detects the fill level in the storage container 2 (i.e. the surface of the cone of milling material shown schematically by the arched line) and transmits a signal to the control unit 8 via a connection line (shown schematically by the dashed line), which signals that a specific fill level has been reached.

FIG. 2 shows a flow chart of the operation of the control unit 8 of the inlet arrangement of the present invention.

The force sensor 6 and the level sensor 7 transmit signals to the control unit 8. The signals are typically converted by A/D converters 10, 11 and further processed in processing units 12, 13. Said processing may comprise an operation selected from the group consisting of scaling, offset and filtering, and combinations thereof.

The processed signals are transmitted to a calculation unit 14. In said calculation unit 14, a sensor value for the force sensor 6 is determined in dependence from the values detected by the level sensor 7. Said calculation may involve a calibration of the signals provided by the force sensor 6 on the basis of the signals provided by the level sensor 7.

The thus obtained signal value is transmitted into a regulation unit 15, where the obtained signal value is compared with a setpoint level S that may be provided by an operator, for example via an input signal or a computer interface. If as a result of the comparison of the obtained signal value with the setpoint level a deviation of the two values is identified, the obtained signal value is adjusted to the setpoint value, as described above. Therewith, an output signal is generated that is transmitted, preferably via a D/A converter 16, to a machine control element 17. Said machine control element 17 may accordingly be caused to influence the flow of the material out of the storage container 2, for example by operating the metering device 5.

The invention claimed is:

1. An inlet arrangement for a grinding machine, comprising:
- a storage container with at least one milling material inlet and at least one milling material outlet;
- at least one metering device arranged in the storage container for metering milling material into a milling gap of the grinding machine, through the milling material outlet;
- a main sensor, provided at the storage container at a level for determining a weight force exerted by the milling material;
- an additional sensor, provided at the storage container for determining a milling material level in the storage container; and,
- a control unit which is connected or connectable to the main sensor and the additional sensor; wherein:
  - the additional sensor extends into the storage container to a level that corresponds to the level where the main sensor is provided; and,
  - the control unit is configured to generate, from the values determined by the main sensor and the additional sensor and from a setpoint value, an output signal to control the flow of the milling material out of the storage container.

2. The inlet arrangement according to claim 1, wherein the control unit is configured to generate said output signal based on a comparison of a value, calculated from the values derived from the main sensor and the additional sensor, with said setpoint value.

3. The inlet arrangement according to claim 1, wherein the additional sensor is a level sensor.

4. The inlet arrangement according to claim 1, wherein one or more additional sensors are 1 to 6 level sensors.

5. The inlet arrangement according to claim 1, wherein the main sensor is a force sensor which comprises an extension arm that protrudes into the storage container, wherein said extension arm is provided at a level that corresponds to the level where one end of the additional sensor in the storage container is located.

6. The inlet arrangement according to claim 1, wherein the main sensor is arranged in a lower region, of the storage container.

7. The inlet arrangement according to claim 1, wherein the inlet arrangement further comprises a machine control element operatively connected to the control unit.

* * * * *